United States Patent
Tonegawa

(10) Patent No.: US 8,415,918 B2
(45) Date of Patent: Apr. 9, 2013

(54) CHARGING SYSTEM OF ELECTRIC POWERED VEHICLE

(75) Inventor: Hiromi Tonegawa, Kounan (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/812,494

(22) PCT Filed: Dec. 12, 2008

(86) PCT No.: PCT/JP2008/072650
§ 371 (c)(1),
(2), (4) Date: Oct. 4, 2010

(87) PCT Pub. No.: WO2009/090813
PCT Pub. Date: Jul. 23, 2009

(65) Prior Publication Data

US 2011/0022222 A1 Jan. 27, 2011

(30) Foreign Application Priority Data

Jan. 15, 2008 (JP) .................................. 2008-005560

(51) Int. Cl.
*H02J 7/00* (2006.01)

(52) U.S. Cl.
USPC .......................................... 320/109; 320/137

(58) Field of Classification Search .................... 320/109
See application file for complete search history.

(56) References Cited

U.S. PATENT DOCUMENTS

| 5,462,439 A * | 10/1995 | Keith ............................. 320/109 |
| 5,552,789 A * | 9/1996 | Schuermann ................. 340/5.21 |
| 2005/0248310 A1 * | 11/2005 | Fagan et al. .................... 320/106 |
| 2008/0303629 A1 * | 12/2008 | Yamagiwa ...................... 340/5.6 |
| 2009/0043450 A1 | 2/2009 | Tonegawa et al. |

FOREIGN PATENT DOCUMENTS

| JP | A-6-343204 | 12/1994 |
| JP | A-9-198571 | 7/1997 |
| JP | A-10-262303 | 9/1998 |
| JP | A-10-262304 | 9/1998 |
| JP | A-2001-312772 | 11/2001 |
| JP | A-2006-262570 | 9/2006 |
| JP | A-2007-193732 | 8/2007 |
| JP | A-2007-252016 | 9/2007 |
| WO | WO 2007/105579 A1 | 9/2007 |

OTHER PUBLICATIONS

International Search Report issued in corresponding International Patent Application No. PCT/JP2008/072650 mailed Mar. 3, 2009 (with translation).
Written Opinion of the International Searching Authority dated Mar. 3, 2009 in International Patent Application No. PCT/JP2008/072650 (with translation).
International Preliminary Report on Patentability dated Feb. 5, 2010 in International Patent Application No. PCT/JP2008/072650 (with translation).
Japanese Office Action dated Feb. 20, 2009 in Japanese Patent Application No. 2008-005560 (with translation).
Japanese Office Action dated Oct. 14, 2009 in Japanese Patent Application No. 2008-005560 (with translation).

* cited by examiner

*Primary Examiner* — Edward Tso
*Assistant Examiner* — Johali Torres Ruiz
(74) *Attorney, Agent, or Firm* — Oliff & Berridge, PLC

(57) ABSTRACT

A charge instructing device installed in a space such as an indoor space in which the security is ensured reads key information (ID) stored in a vehicle key held in a key holding unit and transmits the read ID to an electric powered vehicle. Electric powered vehicle performs authentication by checking the ID transmitted from charge instructing device against registration information stored in advance. The result of the authentication is then transmitted from electric powered vehicle to charge instructing device. Charge instructing device permits a charger to charge electric powered vehicle according to the result of the authentication transmitted from electric powered vehicle.

15 Claims, 10 Drawing Sheets

CHARGING SYSTEM OF ELECTRIC POWERED VEHICLE

TECHNICAL FIELD

The present invention relates to a charging system of an electric powered vehicle, and more specifically to a system for charging an electric storage device mounted to an electric powered vehicle with an external power source for electric powered vehicle.

BACKGROUND ART

In recent years, as an environmentally-friendly vehicle, an electric powered vehicle, such as an electric vehicle, a hybrid vehicle, a fuel-cell vehicle, and the like mounted with an electric storage device and a motor as a drive device are receiving attentions. In particular, in an electric powered vehicle, charging the electric storage device with a power source outside the vehicle (hereinafter, referred to as external power source) is proposed. Notably contribution of charging an electric storage device of an electric powered vehicle with midnight power on suppression of the total running cost and reduction in $CO_2$ emission is expected.

There is a charger, as disclosed in Japanese Patent Laying-Open No. 10-262303 (Patent document 1), wherein a vehicle key of an electric car is in a form of an IC card and the IC card is inserted into the charger to thereby enable battery charging in a vehicle sharing system. In such a case, identification of a user of the charger is enabled, and use by third persons can be prevented.

Japanese Patent Laying-Open No. 2006-262570 (Patent document 2) proposes an electric power supply system that executes authentication and billing processes by transmission and reception of information using power line carrier communication in charging a battery of an electric vehicle. Concretely, by using a PLC (Power Line Communications) modem for inputting and outputting a power line carrier signal to and from a power cable, transmission and reception of information can be readily realized without providing a communication line separately.

Patent document 1: Japanese Patent Laying-Open No. 10-262303
Patent document 2: Japanese Patent Laying-Open No. 2006-262570

DISCLOSURE OF THE INVENTION

Problems to be Solved by the Invention

In the system for external charging as described above wherein the charger mounted to the electric powered vehicle is charged with the external power source, it is necessary to permit charging after conducting an authentication operation for correctly identifying a charge target vehicle in order to bill the electricity rate correctly for the vehicle that charges the battery.

However, when the system is so configured that an authentication operation is requested only at the start of charging, there is a problem that charging of other vehicle is enabled by a reconnection of the cable to the other vehicle during external charging. Therefore, it is preferred to manage a system in such a manner that external charging is executed while the vehicle key for authentication is kept inserted into the charger.

On the other hand, at the time of external charging, since it is necessary to electrically connect the charger and the electric powered vehicle by a cable or the like, the charger is preferably installed near the parking space of the vehicle. Therefore, the charger is often installed outdoors. For this reason, in Patent document 1 and the like, it is problematic in terms of security to leave the vehicle key for authentication in the charger.

In particular, when a vehicle key for charging and a key for starting the vehicle are implemented by a common key for convenience of the user, the problem further increases because the vehicle itself can be stolen under management of the system as described above.

In the electric power supply system of Patent document 2, user information is automatically read out from the vehicle in response to the start of power supply to the battery, and charging is permitted when the read out user information coincides with user information registered in advance.

However, when a system for external charging is configured, for example, in a parking lot of a store shared by an unspecified number of vehicles, the management that charging is permitted only for vehicles (users) registered in advance is inconvenient for users, and it is necessary to conduct an authentication operation taking correct identification of a charge target vehicle into account. Further, since user information is automatically read out from the vehicle in response to a connection of a cable, the security in reading out authentication information is not necessarily satisfactory.

The present invention was devised to solve such problematic points, and it is an object of the present invention to provide a charging system of an electric powered vehicle capable of permitting an electric storage device to charge with an external power source after authenticating a charge target vehicle conveniently and reliably.

Means for Solving the Problems

A charging system of an electric powered vehicle of the present invention includes an electric powered vehicle mounted with an electric storage device, a charger for charging the electric storage device with an external power source outside the electric powered vehicle, and a charge instructing device for giving an instruction about whether to permit an external charging to the electric storage device by the external power source based on key information stored in a vehicle key of the electric powered vehicle. The electric powered vehicle includes a first receiving unit for receiving key information, an authentication unit for generating authentication information by checking the key information received by the first receiving unit against registration information stored in advance, and a first transmitting unit for transmitting the generated authentication information. The charge instructing device includes a key holding unit for holding a vehicle key, a reading unit for reading out key information from the vehicle key held by the key holding unit, a second transmitting unit for transmitting the read out key information to the electric powered vehicle, a second receiving unit for receiving the authentication information from the first transmitting unit, a determining unit for determining whether to permit the external charging based on the authentication information received by the second receiving unit, and a third transmitting unit for transmitting a determination result by the determining unit to the charger. The charger includes a third receiving unit for receiving a determination result from the third transmitting unit, and a power feeding unit. The power feeding unit is configured to feed power to the electric powered vehicle connected to the charger via a power line from the external power source, when external charging is permitted by the determining unit based on the determination result received by the third receiving unit.

A charging system of an electric powered vehicle in another aspect of the present invention includes a charger for charging an electric storage device mounted to the electric powered vehicle with an external power source outside the electric powered vehicle, and a charge instructing device for giving an instruction about whether to permit an external charging to the electric storage device by the external power source based on key information stored in a vehicle key of the electric powered vehicle. The charge instructing device includes a key holding unit for holding a vehicle key, a reading unit for reading out key information from the vehicle key held by the key holding unit, a key information transmitting unit for transmitting the read out key information to the electric powered vehicle, an authentication information receiving unit for receiving authentication information that is generated by checking of key information against predetermined registration information in the electric powered vehicle and transmitted from the electric powered vehicle, a determining unit for determining whether to permit the external charging based on the received authentication information, and a determination result transmitting unit for transmitting a determination result by the determining unit to the charger. The charger includes a determination result receiving unit for receiving a determination result from the charge instructing device, and a power feeding unit for feeding power to the electric powered vehicle connected to the charger via a power line from the external power source when external charging is permitted by the determining unit based on the received determination result.

Preferably, the charger includes a mechanism that relays key information transmitted from the charge instructing device to the electric powered vehicle and authentication information transmitted from the electric powered vehicle to the charge instructing device between the electric powered vehicle connected to the charger via a power line and the charge instructing device.

According to the above charging system of an electric powered vehicle, by transmitting/receiving key information and authentication information between the charge instructing device installed in a site separate from the external power source (charger) required to be connected with the electric powered vehicle, and the electric powered vehicle, it is possible to authenticate an electric powered vehicle which is to be a target of charging by such a configuration that key information is read out from a vehicle key by the charge instructing device. As a result, such a management that authentication is continuously made over the charging term by leaving the vehicle key in the charge instructing device rather than in the charger installed close to a parking space of the electric powered vehicle. Therefore, it becomes possible to execute a simple authentication operation using a vehicle key while ensuring the security by installing the charge instructing device in a space such as indoors where security is ensured.

Preferably, the charge instructing device is installed in a space where a locking mechanism for permitting entrance and exit according to electronic authentication is provided.

With such a configuration, since the charge instructing device can be installed in an electronically-locked space, security of the system can be further improved.

More preferably, the charge instructing device further includes an authentication medium issuing unit. The authentication medium issuing unit issues a medium to be used for electronic authentication in unlocking the locking mechanism, in response to holding of the vehicle key by the key holding unit.

With such a configuration, it is possible to smoothly manage the system that improves the security by electronically locking the space where the charge instructing device is installed while leaving the vehicle key in the charge instructing device.

Preferably, the key holding unit is configured to hold the vehicle key and lock the holding state. The charge instructing device further includes a rate calculating unit for calculating electricity rate by external charging, and a lock control unit. The lock control unit unlocks the vehicle key in the key holding unit in response to payment of the electricity rate.

With such a configuration, the holding state of the vehicle key can be locked during the external charging, and unlocked in exchange for payment of a charging rate after end of charging. As a result, it is possible to configure a charging system suited for sharing by an unspecified plurality of vehicles installed, for example, in a parking lot of store.

Alternatively, preferably, the charge instructing device further includes a charge permitted target storing unit for registering in advance authentication information corresponding to the electric powered vehicle for which external charging by the charger is permitted. The determining unit prohibits external charging when authentication information received by the second receiving unit or authentication information receiving unit does not coincide with authentication information registered in the charge permitted target storing unit.

With such a configuration, it is possible to further authenticate whether or not the electric powered vehicle is a charge permitted vehicle registered in advance by the charge instructing device. Therefore, it is possible to configure a charging system suited for sharing by a specified plurality of vehicles installed, for example, in a parking lot of an apartment house.

A charging system of an electric powered vehicle in still another aspect of the present invention includes a charger for charging an electric storage device mounted to an electric powered vehicle with an external power source outside the electric powered vehicle, and a charge instructing device for indicating permission/prohibition of external charging to the electric storage device by the external power source based on key information stored in a vehicle key of the electric powered vehicle. The charge instructing device includes a reading unit for reading out key information from the vehicle key, an authentication unit, and a determining unit. The authentication unit generates authentication information by checking the key information read out by the reading unit, against registration information stored in advance for representing the electric powered vehicle for which external charging by the charger is permitted. The determining unit determines whether to permit external charging based on the authentication information generated by the authentication unit. The charger includes a power feeding unit for feeding power from the external power source to the electric powered vehicle connected to the charger via a power line when external charging is permitted by the determining unit.

According to the above charging system of an electric powered vehicle, it is possible to configure a system that permits charging to an electric powered vehicle from the charger after authenticating whether or not the electric powered vehicle is a charge permitted vehicle that is registered in advance based on the key information read out from the vehicle key by the charge instructing device. As a result, it is possible to configure a charging system suited for sharing by specific plural vehicles installed, for example, in a parking lot of an apartment house.

Preferably, the charging system further includes a detecting unit that detects a disconnection of a power line during power feeding to the electric powered vehicle by the power feeding unit. In addition, the determining unit cancels permission of external charging when the disconnection of the power line is detected by the detecting unit.

With such a configuration, it is possible to prevent charging to other electric powered vehicle than authenticated one by requesting new authentication when the power line is disconnected during external charging.

Alternatively, preferably, the vehicle key is common with a vehicle start key for starting the electric powered vehicle.

With such a configuration, since vehicle operation and authentication at the time of external charging can be executed with a common key utilizing the improved security of the charging system according to the present invention, the user convenience can be improved.

Effects of the Invention

According to the charging system of an electric powered vehicle of the present invention, it is possible to permit charging of the electric storage device by the external power source after authenticating the charge target vehicle conveniently and reliably.

Figure 1:
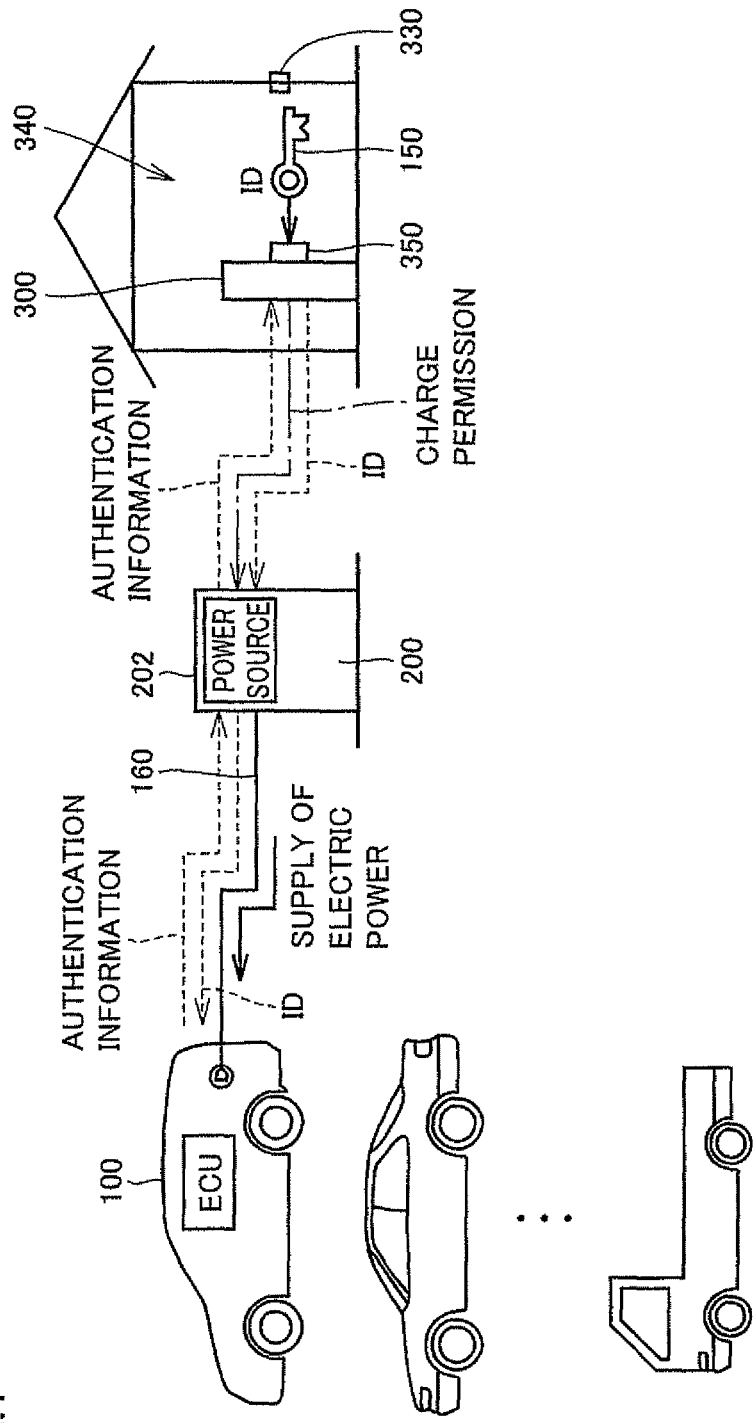
FIG. 1 is a drawing for describing a concept of configuration of a charging system of an electric powered vehicle according to a first embodiment of the present invention.

DESCRIPTION OF THE REFERENCE SIGNS 100 electric powered vehicle, 102 main battery (charger), 104 motor driving inverter, 106 motor, 108 wheel, 110 charging AC/DC converting unit, 114 main control ECU, 115 receiver-transmitter (electric powered vehicle), 116 receiving unit (electric powered vehicle), 117 transmitting unit (electric powered vehicle), 120 connector connection detecting unit, 122 charging relay, 124 charging connector, 129 immobilizer ECU, 130 nonvolatile memory, 132 key holding antenna, 150 vehicle key, 160 power feeding cable, 200 charger, 202 external power source, 204 power feeding relay, 205 receiver-transmitter (charger), 206,216,218 receiving unit (charger), 207,217 transmitting unit (charger), 210 ECU (charger), 220 charging plug, 250 communication cable, 300 charge instructing device, 305 receiver-transmitter (charge instructing device), 306 receiving unit, 307,308 transmitting unit, 310 ECU (charge instructing device), 312 immobilizer ID reading unit, 313 lock control unit, 314 electricity rate calculating unit, 315 determining unit, 318 authentication unit, 330 locking mechanism, 340 space (security is ensured), 350 key holding unit, 360 money receiving unit, 370 authentication medium issuing unit, 375 electronic key, 390 ID database

BEST MODES FOR CARRYING OUT THE INVENTION

Embodiments of the present invention will be described specifically below with reference to the drawings. The same or corresponding portions in the drawings will be provided with the same reference numerals and they will not be described repeatedly.

First Embodiment

FIG. 1 is a drawing for describing a concept of configuration of a charging system of an electric powered vehicle of the first embodiment of the present invention.

With reference to FIG. 1, a charging system according to the first embodiment includes an electric powered vehicle 100, a charger 200, and a charge instructing device 300.

Electric powered vehicle 100 is mounted with an electric storage device (not illustrated) and an immobilizer system (not illustrated) for vehicle authentication. The immobilizer system recognizes a transponder key including a transponder to which an ID code written, and permits starting of a starter of the vehicle such as an engine starter.

Charger 200 is installed in a parking lot of a single-family house or an apartment house or a long-term parking lot, or a parking lot of a store or the like, and has an external power source 202 for charging the electric storage device mounted to electric powered vehicle 100. Charger 200 carries out charging of the electric storage device by external power source 202 while connecting electric powered vehicle 100 and external power source 202 (hereinafter, also referred to simply as "external charging") by means of a power feeding cable 160 which is a "power line".

As external power source 202, a system power supply is typically used, however, it may be configured by a power system that stores and/or converts electric power generated by other power generating mechanism such as a photovoltaic power generation panel. In the present embodiment, external power source 202 represents a power node capable of taking out electric power from such a power supply system to electric powered vehicle 100 by means of power feeding cable 160.

At the time of external charging, it is necessary to permit the charging after conducting an authentication operation for correctly recognizing an electric powered vehicle which is a target of charging connected to charger 200. At this time, for improving the accuracy of authentication, it is preferred to execute an authentication operation continuously over the charging term than just at the time of start of the external charging.

On the other hand, charger 200 is placed near a parking position of electric powered vehicle 100, generally outdoors for the need of a connection by power feeding cable 160. Therefore, in the charging system according to the first embodiment, charge instructing device 300 is further provided in a space 340 where security is ensured, for example, indoors. Space 340 is provided in a lockable indoor space. In a parking lot of store or the like, security may be provided, for example, by a watcher. Preferably, space 340 is a space that is locked by a locking mechanism 330 according to electronic authentication.

Charge instructing device 300 includes a key holding unit 350 for holding a vehicle key 150. Vehicle key 150 is an electronic key to which an ID code for identifying electric powered vehicle 100 is written. Vehicle key 150 is configured, for example, by a transponder key of the immobilizer system, and is preferably, common with a starter key of electric powered vehicle 100.

Charge instructing device 300 has a function of reading out key information (ID code) stored in vehicle key 150 held by key holding unit 350. The read out ID code is relayed by charger 200 and transmitted to electric powered vehicle 100.

Then in electric powered vehicle 100, authentication can be executed by checking the ID code (key information) transmitted from charge instructing device 300 against registration information (ID) stored in advance. Then, authentication information representing the authentication result is relayed by charger 200 and transmitted to charge instructing device 300.

Charge instructing device 300 permits charging of electric powered vehicle 100 by charger 200 based on authentication information transmitted from electric powered vehicle 100. That is, when the authentication information is normal, and electric powered vehicle 100 connected to charger 200 by power feeding cable 160 is correctly recognized, charge permission is issued to charger 200. In response to the charge permission from charge instructing device 300, charger 200 starts charging of the electric storage device of electric powered vehicle 100 by external power source 202 and supplies electric powers.

In this manner, in the charging system according to the first embodiment, external charging can be executed while continuous authentication over the charging term is enabled by maintaining the state that vehicle key 150 is held in charge instructing device 300 installed in space 340 where security is ensured, rather than in charger 200 which is preferably installed outdoors.

Figure 2:
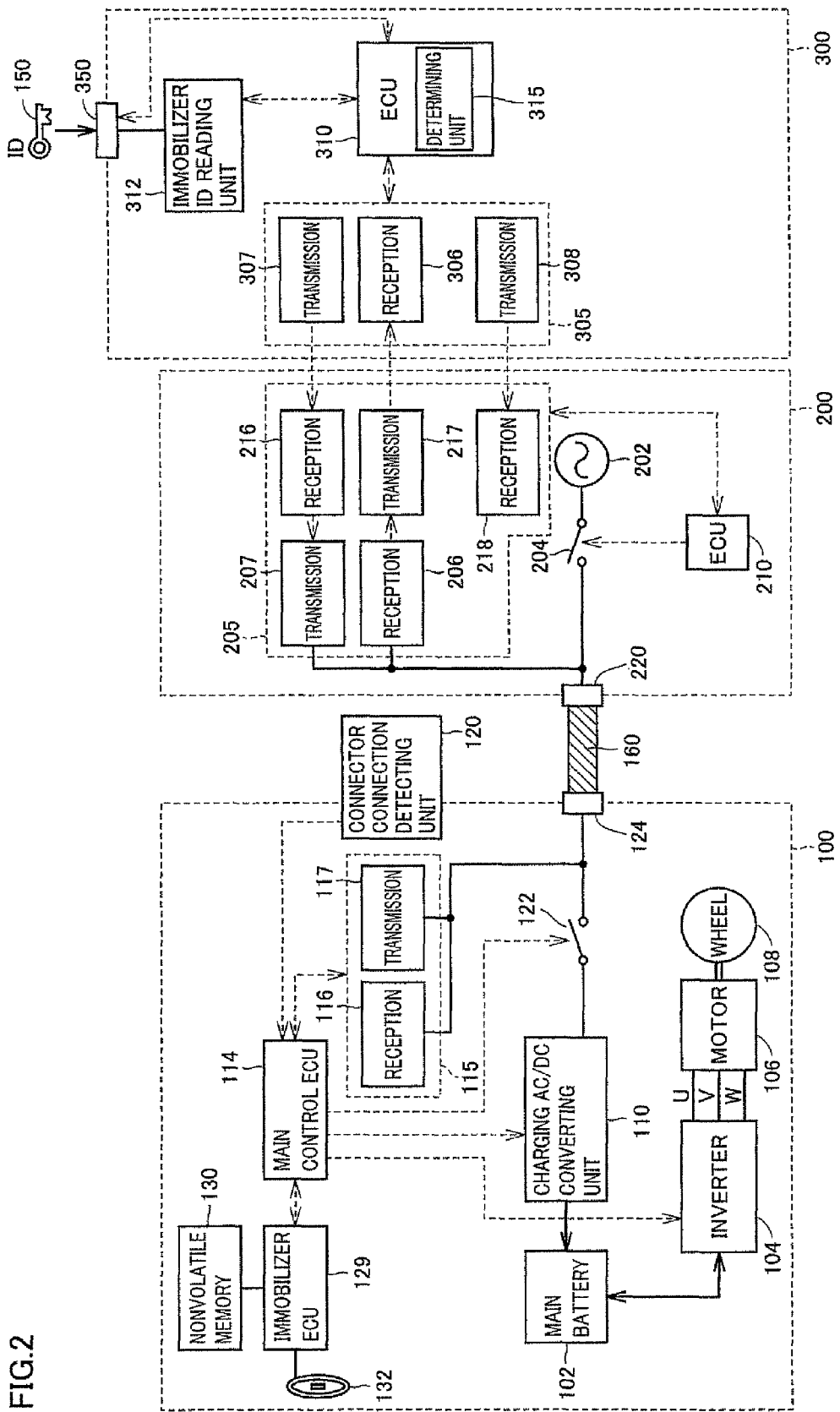
FIG. 2 is a block diagram for specifically describing configuration of a charging system according to the first embodiment shown in FIG. 1.

FIG. 2 is a block diagram for specifically describing the configuration of the charging system according to the first embodiment shown in FIG. 1.

With reference to FIG. 2, electric powered vehicle 100 includes wheels 108, a motor 106 for driving wheels 108, an inverter 104 for providing three-phase AC electric power to motor 106, a main battery 102 for supplying DC electric power to inverter 104, and a main control ECU 114 for controlling inverter 104, and a receiver-transmitter 115, Main battery 102 corresponds to the "electric storage device" mounted to electric powered vehicle 100.

Electric powered vehicle 100 is mounted with motor 106 that generates vehicle driving power by electric power stored in main battery 102 (electric storage device). In the present invention, electric powered vehicle 100 includes hybrid vehicle and so on that use both a motor and an engine for driving, in addition to an electric vehicle and a fuel-cell vehicle generating vehicle driving power only by a motor, in general.

Electric powered vehicle 100 includes a key holding antenna 132, an immobilizer ECU (Electronic Control Unit) 129, and a nonvolatile memory 130. Key holding antenna 132 provided around a keyhole into which transponder key is inserted can read the ID code of the transponder key by electromagnetic coupling without contact.

Immobilizer ECU 129 reads the ID code stored in the transponder key owned by the owner of the vehicle as key information and permits main control ECU 114 to start the vehicle when the key information matches with registration information registered in advance in nonvolatile memory 130. In other words, the above-mentioned transponder key corresponds to a starter key for electric powered vehicle 100. As described above, the transponder key may be used in common with vehicle key 150 for authentication of external charging.

Electric powered vehicle 100 is formed so that main battery 102 can be charged from outside the vehicle. For example, electric powered vehicle 100 includes a charging connector 124 provided with a terminal to which a commercial power such as AC 100V is given from outside, a charging AC/DC converting unit 110 for converting the AC electric power given to charging connector 124 into DC electric power and giving it to main battery 102, a charging relay 122 for connecting charging connector 124 and charging AC/DC converting unit 110, and a connector connection detecting unit 120 for detecting that charging connector 124 is electrically connected to charger 200 via power feeding cable 160.

As other configuration of the electric powered vehicle that can be externally charged, AC/DC conversion may be realized by using motor driving inverter 104 as an inverter capable of AC/DC reversible conversion and making the inverter to conduct a reverse conversion operation. Further, a generator and a generator inverter may be mounted so that external charging is executed by electrically connecting a neutral point of stator coils of motor 106 and a neutral point of stator coils of the generator, and external power source 202.

Main control ECU 114 monitors a SOC (State Of Charge) which is a value representing a charging state (remaining capacity) of main battery 102, and connector connection detecting unit 120 detects an electric connection between charging connector 124 and charger 200 (charging plug 220) via power feeding cable 160 (power feeding cable connection). Main control ECU 114 makes charging relay 122 transit from ON to OFF and causes charging AC/DC converting unit 110 to operate to charge main battery 102 when power feeding cable 160 is connected to charging connector 124 and SOC is lower than a predetermined value.

Further, receiver-transmitter 115 includes a receiving unit 116 for receiving key information (ID) transmitted from charger 200, and a transmitting unit 117 for transmitting an authentication result to be sent to charge instructing device 300. Receiving unit 116 and transmitting unit 117 are shown as functional blocks respectively corresponding to a receiving operation and a transmitting operation executed by receiver-transmitter 115.

Main control ECU 114 checks key information (ID) received by receiving unit 116 against registration information (ID) stored in advance, and generates an authentication result. The authentication result is transmitted by transmitting unit 117 as described above. When the ID check result is OK, and the condition for external charging is satisfied, the authentication result is determined as normal (OK) for requesting external charging.

When main control ECU 114 receives a notification that the ID is authentic from the immobilizer ECU and when the ID is transmitted from ring antenna (not shown) close to a keyhole, main control ECU 114 starts devices such as inverter 104 and motor 106 for causing the vehicle to travel. However, when the ID is transmitted via a route other than that, starting of the devices is prohibited. Main control ECU 114 also prohibits starting of the devices for causing the vehicle to travel when connector connection detecting unit 120 detects that charging connector is connected. For example, as connector connection detecting unit 120, a sensor for detecting a connection of power feeding cable 160 may be provided to a charging port of the vehicle. A magnet may be embedded in a connector part of power feeding cable 160 and a magnet sensor may detect proximity of the magnet. A switch that is pushed down by contact may be provided to charging connector 124 as a sensor. In this way, it is possible to prevent electric powered vehicle 100 from traveling by mistake during charging or before the charging cable is detached from the vehicle after end of charging.

Charger 200 includes an external power source 202, a power feeding relay 204, a receiver-transmitter 205, an ECU 210, and a charging plug 220. Charging plug 220 is electrically connected to charging connector 124 of electric powered vehicle 100 via power feeding cable 160.

Receiver-transmitter 205 includes a receiving unit 216 for receiving key information (ID) from charge instructing device 300, a transmitting unit 207 for transmitting key information (ID) received by receiving unit 216 to electric powered vehicle 100, a receiving unit 206 for receiving an authentication result from electric powered vehicle 100, a transmitting unit 217 for transmitting the authentication result received by receiving unit 206 to charge instructing device 300, and a receiving unit 218 for receiving a charge determination result (charge permission) from charge instructing device 300. Receiving units 206,216,218 and transmitting units 207,217 are shown as functional blocks corresponding to a receiving operation and a transmitting operation executed by receiver-transmitter 205.

Communication between electric powered vehicle 100 (receiver-transmitter 115) and charger 200 (receiver-transmitter 205) is preferably executed via power feeding cable 160. In the drawing, the electric power supply route from external power source 202 and communication route of information such as key information (ID) are depicted by the same route, however, these routes may be implemented by using common wiring by power line communication, or the power line and the communication line may be implemented by separate wirings.

Figure 12:
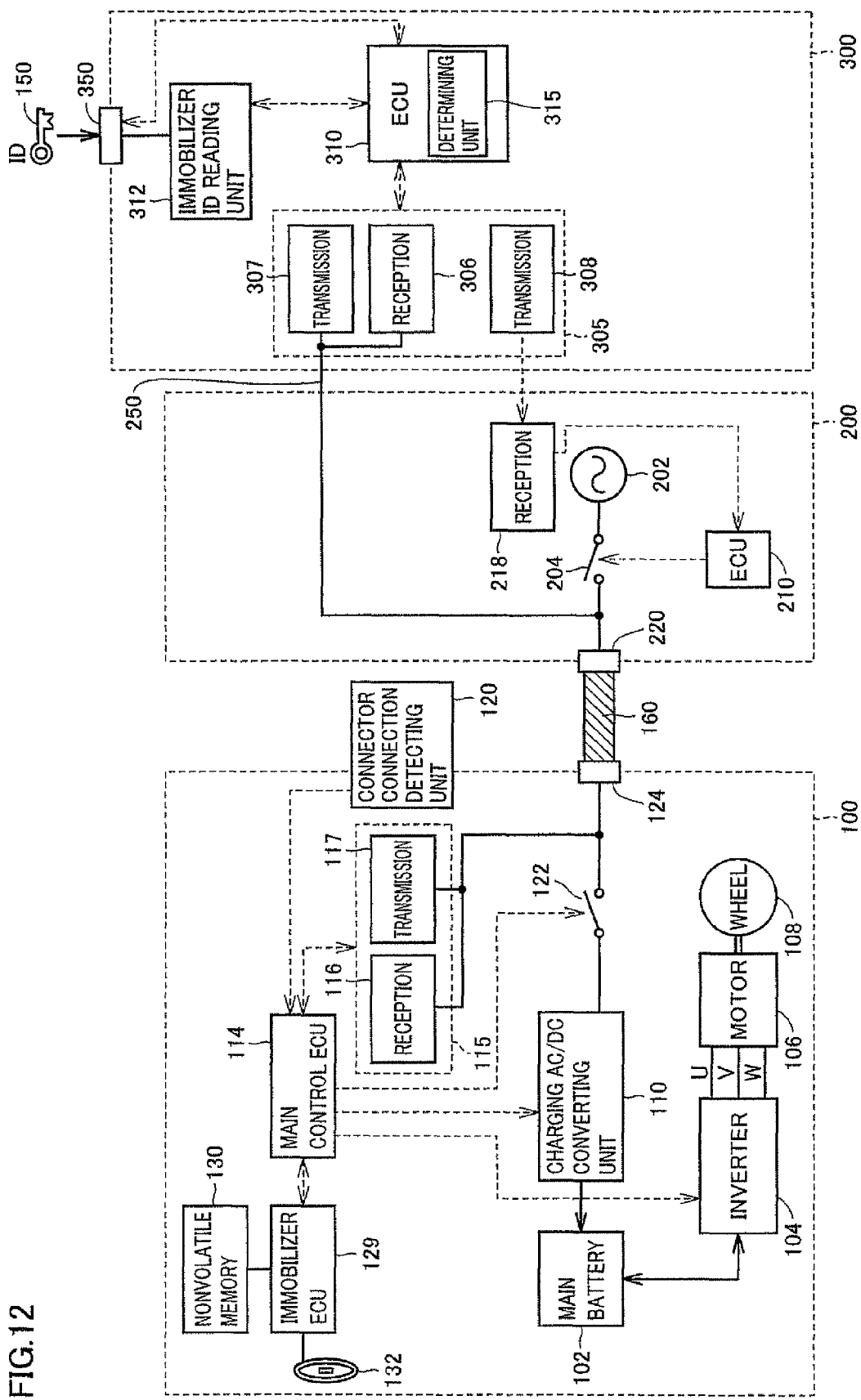
FIG. 12 is a drawing for describing a concept of a modified example of configuration of the charger shown in FIG. 1.

Further, as shown in FIG. 12, by arranging a communication cable 250 in place of receiving units 206,216 and transmitting units 207,217 of charger 200, it is possible to connect charge instructing device 300 and electric powered vehicle 100 via power feeding cable 160 in such a manner that they can communicate each other. In this manner, transmission and reception of information such as key information (ID) and an authentication result between charge instructing device 300 and electric powered vehicle 100 relayed by charger 200 can be realized with a simple configuration.

Charger 200 (receiver-transmitter 205) and charge instructing device 300 (receiver-transmitter 305) are bi-directionally communicatable in a wired or wireless manner. Alternatively, charge instructing device 300 (receiver-transmitter 305) and electric powered vehicle 100 (receiver-transmitter 115) may be configured to be directly communicatable each other in a wireless manner. In other words, key information (ID) and an authentication result may be transmitted and received between charge instructing device 300 and electric powered vehicle 100 without relayed by charger 200.

ECU 210 executes a supply of electric power from external power source 202 to electric powered vehicle 100 by turning on power feeding relay 204 in response to power feeding permission from charge instructing device 300. That is, when power feeding is not permitted by charge instructing device 300, power feeding relay 204 is turned off and a supply of electric power from external power source 202 to electric powered vehicle 100 is blocked. As for power feeding relay 204, it may be provided in the course of power feeding cable 160.

Charger 200 has a mechanism capable of detecting whether or not charging plug 220 is electrically connected to charging connector 124 via power feeding cable 160. For example, whether or not such connection is present can be detected based on communication with electric powered vehicle 100.

Charge instructing device 300 includes a key holding unit 350, a receiver-transmitter 305, an ECU 310, and an immobilizer ID reading unit 312.

Key holding unit 350 holds vehicle key 150. Whether vehicle key 150 is held by key holding unit 350 can be recognized by ECU 310. Immobilizer ID reading unit 312 reads key information (ID) stored in vehicle key 150 held by key holding unit 350. Key information (ID) read by immobilizer ID reading unit 312 is transmitted to ECU 310.

Receiver-transmitter 305 includes a transmitting unit 307 for transmitting key information (ID) read out from vehicle key 150 toward electric powered vehicle 100, a receiving unit 306 for receiving an authentication result sent from electric powered vehicle 100, and a transmitting unit 308 for transmitting a charge determination result (charge permission) by ECU 310 to charger 200. Receiving unit 306 and transmitting units 307,308 are shown as functional blocks corresponding to a receiving operation and a transmitting operation executed by receiver-transmitter 305.

ECU 310 includes a determining unit 315 that executes determination of permission of external charging based on an authentication result, Determining unit 315 corresponds to a functional block implemented by a processing by ECU 310.

As described above, in the charging system of the first embodiment, electric key information (ID) and an authentication result can be transmitted and received between electric powered vehicle 100 and charge instructing device 300 as shown in FIG. 1, and a charge determination result (charge permission) based on the authentication result can be transmitted to charger 200.

Here, since the immobilizer system is a system for preventing a theft, by making electric powered vehicle 100 undertake execution of authentication in consideration of security aspect in the charging system of the first embodiment, there is no need to accumulate ID codes in charger 200 and charge instructing device 300 which are shared devices.

Figure 3:
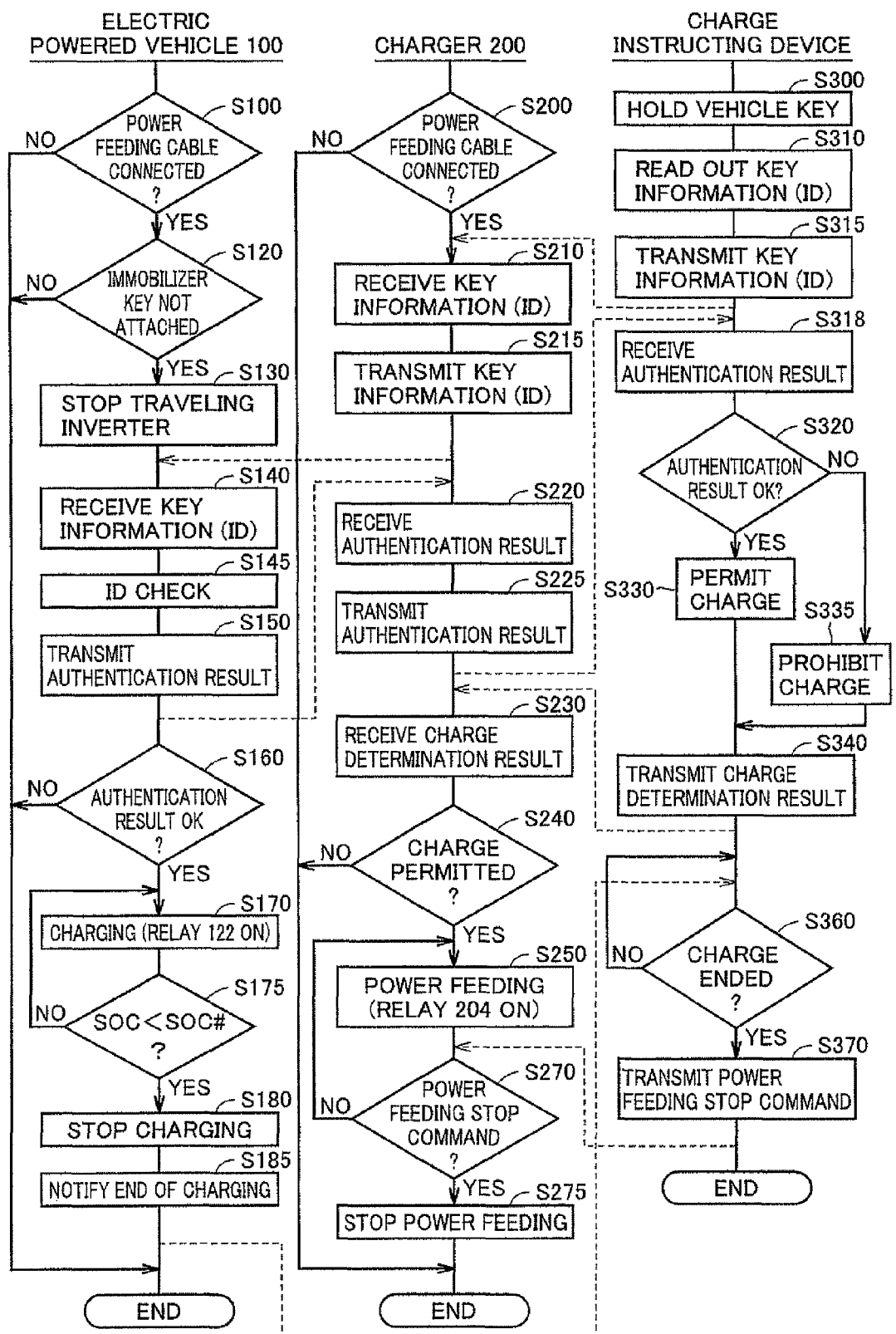
FIG. 3 is a flowchart (Part 1) for describing a processing procedure of authentication and external charging of an electric powered vehicle in the charging system according to the first embodiment.
Figure 4:
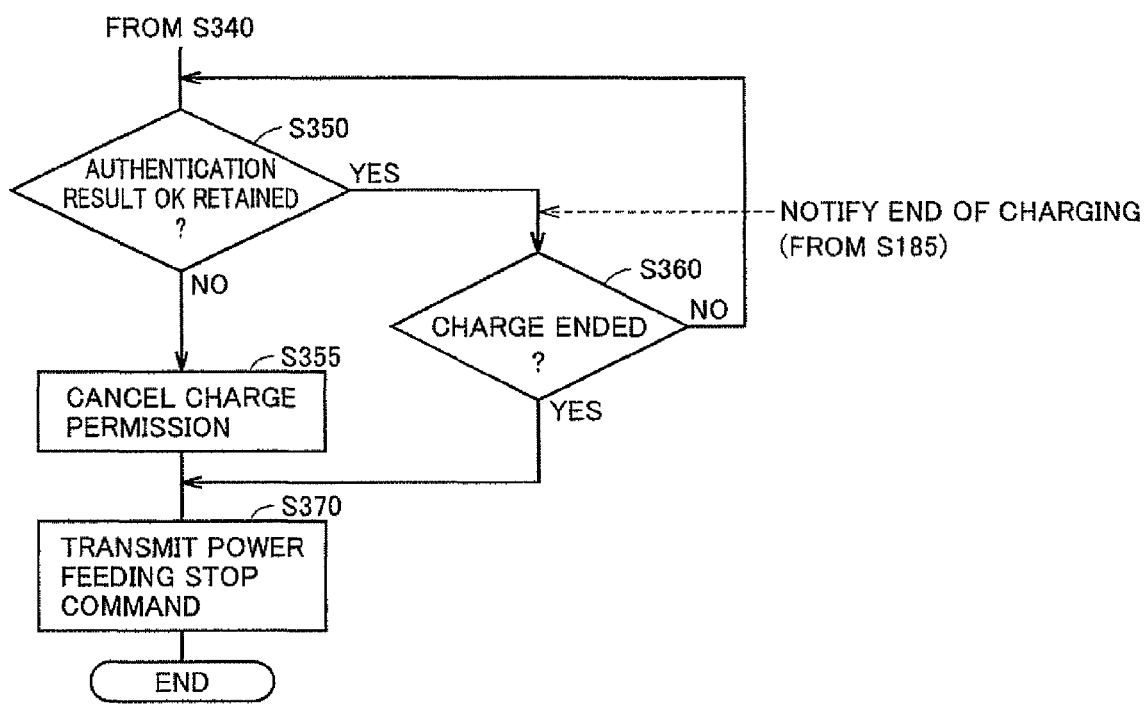
FIG. 4 is a flowchart (Part 2) for describing a processing procedure of authentication and external charging of an electric powered vehicle in the charging system according to the first embodiment.

FIG. 3 and FIG. 4 are flowcharts for describing a procedure of authentication and external charging of electric powered vehicle in the charging system according to the first embodiment.

As shown in FIG. 3, through information transmission and reception between electric powered vehicle 100, charger 200, and charge instructing devices 300, authentication and charging at the time of external charging of electric powered vehicle 100 are controlled.

With reference to FIG. 3, in electric powered vehicle 100, main control ECU 114 determines whether or not power feeding cable 160 is connected to charging connector 124 (presence or absence of power feeding cable connection) in step S100. Determination in step S100 is executed based on a detection of connector connection detecting unit 120 (FIG. 2). When a power feeding cable connection is absent (NO determination in S100), the subsequent steps are not executed, and the processing ends without conducting external charging.

Main control ECU 114 determines whether or not an immobilizer key, namely, a vehicle start key is attached to the key hole of the vehicle in step S120 when the power feeding cable is connected (YES determination in S100). Also when a vehicle start key is attached to the key hole (NO determination in S120), the subsequent steps are not executed, and the processing ends without conducting external charging.

On the other hand, when an immobilizer key is not attached to the key hole (YES determination in S120), main control ECU 114 stops traveling inverter 104 to disable the vehicle to travel in step S130. For example, at this time, the vehicle may be forced to shift to a parking position, and wheels 108 may be locked mechanically.

On the other hand, in charger 200, ECU 210 determines, likewise in step S100, whether or not charging plug 220 is electrically connected to charging connector 124 via power feeding cable 160 in step S200. When the power feeding cable is connected (YES determination in S200), the system will be ready for execution of external charging through the following steps.

In charge instructing device 300, when holding of vehicle key 150 by the key holding unit 350 is recognized in step S300, ECU 310 reads out key information (ID) in step S310. That is, the processing in step S310 corresponds to the function of immobilizer ID reading unit 312 ("reading unit") in FIG. 2.

Then ECU 310 transmits key information (ID) read out in step S310 to charger 200 in step S315. That is, the processing in step S315 corresponds to the functions of transmitting unit 307 in FIG. 2 ("second transmitting unit" or "key information transmitting unit").

In charger 200, ECU 210 receives key information (ID) transmitted by charge instructing device 300 (step S315) in step S210, and transmits the received key information (ID) to electric powered vehicle 100 in step S215. That is, the processing in step S210 corresponds to the function of receiving unit 216 in FIG. 2, and the processing in step S215 corresponds to the function of transmitting unit 207 in FIG. 2.

In electric powered vehicle 100, main control ECU 114 receives key information from charge instructing device 300 relayed by charger 200 in step S140. That is, the processing in step S140 corresponds to the function of receiving unit 116 in FIG. 2 ("first receiving unit").

As shown in FIG. 12, in the configuration wherein communication cable 250 is provided in place of receiving units 206,216 and transmitting units 207,217 of charger 200, the processings in steps S210 and S215 are omitted, and the key information (ID) transmitted in step S315 is relayed by communication cable 250 and received in step S140. Also in the case where direct communication of key information (ID) is made between charge instructing device 300 and electric powered vehicle 100, the processings of steps S220 and S225 are omitted.

Then, main control ECU 114 checks the received key information (ID) against registration information stored in advance in step S145 to execute ID check. Based on this ID check, an authentication result of electric powered vehicle 100 is generated. As described above, when the ID check result is OK, and a condition for external charging is established, it is determined that the authentication result is normal (OK) for requesting external charging. The processing in step S145 corresponds to the function of "authentication unit" realized by main control ECU 114.

Further, main control ECU 114 transmits a generated authentication result to charger 200 in step S150. That is, the processing in step S150 corresponds to the function of transmitting unit 117 in FIG. 2 ("first transmitting unit").

Further, main control ECU 114 prepares for external charging based on the authentication result in step S160, Concretely, when the authentication result is normal (OK) (YES determination in S160), charging relay 122 is turned on in step S170. As a result, main battery 102 is ready for being charged by supply of electric power from external power source 202 (charger 200). On the other hand, when the authentication result is abnormal (NG) (NO determination in S160), the subsequent steps are not executed, and external charging is not executed.

In charger 200, ECU 210 receives the authentication result transmitted from electric powered vehicle 100 in step S220, and transmits the received authentication result to charge instructing device 300 in step S225. That is, the processing in step S220 corresponds to the function of receiving unit 206 in FIG. 2, and the processing in step S225 corresponds to the function of transmitting unit 217 in FIG. 2.

In charge instructing device 300, ECU 310 receives the authentication result from electric powered vehicle 100 relayed by charger 200 in step S318. That is, the processing of step S318 corresponds to the function of receiving unit 306 in FIG. 2 ("second receiving unit" or "authentication information receiving unit").

Also as shown in FIG. 12, in the configuration where communication cable 250 is provided in place of receiving units 206,216 and transmitting units 207,217 of charger 200, the processings in steps S220 and S225 are omitted, and the authentication result transmitted from electric powered vehicle 100 is relayed by communication cable 250 in step S150 and received in step S318. Also in the case of direct communication of authentication result is made between charge instructing device 300 and electric powered vehicle 100, the processings of steps S220 and S225 are omitted.

Further, ECU 310 determines whether or not the received authentication result is normal (OK) in step S320. When the authentication result is normal (YES determination in S320), it permits external charging in step S330. On the other hand, when the authentication result is abnormal (NG) (NO determination in S320), it prohibits external charging in step S335. That is, the processings in S320 to S335 correspond to the function of determining unit 315 in FIG. 2.

Then, ECU 310 transmits a determination result of permission or prohibition of charging in steps S320 to S335 to charger 200 in step S340. That is, the processing in step S340 corresponds to the function of transmitting unit 308 in FIG. 2 ("third transmitting unit" or "determination result transmitting unit").

In charger 200, ECU 210 receives the charge determination result from charge instructing device 300 in step S230. That is, the processing in step S230 corresponds to the function of receiving unit 218 in FIG. 2 ("third receiving unit" or "determination result receiving unit").

Then, ECU 210 turns on power feeding relay 204 and executes power feeding from external power source 202 to electric powered vehicle 100 in step S250 when charging is permitted in step S240 (YES determination in S240). On the other hand, when charging is prohibited by charge instructing device 300 (NO determination in S240), the processings subsequent to step S250 in charger 200 are skipped, so that external charging will not be started. That is, the function of "power feeding unit" is realized by power feeding relay 204 controlled by ECU 210.

In electric powered vehicle 100, when power feeding to electric powered vehicle 100 is started in step S250, main battery 102 is charged with electric power from external power source 202 because charging relay 122 is turned on in step S170. Main control ECU 114 regularly determines whether or not SOC of main battery 102 reaches a predetermined value SOC# representing completion of charging in step S175 during charging of main battery 102.

Until SOC reaches a predetermined capacity SOC#, main control ECU 114 determines as NO in S175 and continues external charging of main battery 102. On the other hand, when SOC reaches a predetermined capacity SOC# (YES determination in S175), main control ECU 114 stops charging in step S180. As a result, charging relay 122 is turned off. Further, main control ECU 114 notifies charge instructing device 300 of end of charging in step S185. Although not depicted, the charge end notification may be transferred from electric powered vehicle 100 to charge instructing device 300 in a form of being relayed by charger 200.

In charge instructing device 300, ECU 310 determines whether or not charging in electric powered vehicle 100 ends in step S360 after transmitting charge permission in step S340. Upon reception of charge end notification at electric powered vehicle 100, ECU 310 makes determination of YES in step S360 and transmits a power feeding stop command to charger 200 in step S370. On the other hand, until reception of charge end notification (NO determination in S360), ECU 310 does not execute step S370 so that a power feeding stop command is not issued.

In charger 200, ECU 210 determines whether or not a power feeding stop command is issued from charge instructing device 300 in step S270 after starting of power feeding in step S250. Until issuance of a power feeding stop command (NO determination in S270), ECU 210 continues power feeding in step S250. On the other hand, upon issuance of a power feeding stop command by charge instructing device 300 (YES determination in S275), ECU 210 stops power feeding in step S275. That is, power feeding relay 204 is turned off.

By such a series of control processings, it becomes possible to configure the system that permits external charging by charger 200 while conducting authentication of electric powered vehicle 100 (target of charging) connected to charger 200 via power feeding cable 160 based on key information (ID) read out from vehicle key 150 in charge instructing device 300 where security is ensured.

Further, in the charging system according to the first embodiment, by configuring the processings subsequent to charge permission (S340) by ECU 310 as shown in FIG. 4, continuous authentication over the charging term becomes possible by maintaining the condition that vehicle key 150 is held by charge instructing device 300.

With reference to FIG. 4, in the charging system according to the first embodiment, an authentication process by combination of steps S310, S315 (charge instructing device 300), steps S210, S215 (charger 200), and steps S145 to S150 (electric powered vehicle 100) is regularly executed after start of external charging.

ECU 310 determines whether or not the authentication result is kept normal (OK) in step S350. For example, by taking off vehicle key 150 from key holding unit 350, or disconnecting power feeding cable 160 in a connected state from electric powered vehicle 100 and/or charger 200, NO determination is made in step S350.

In the condition that the authentication result is kept normal (OK) (YES determination in S350), ECU 310 issues a power feeding stop command in response to end of charging in electric powered vehicle 100 in steps S360 and S370 shown in FIG. 3.

On the other hand, when the authentication result turns into abnormal (NG) (NO determination in S350) after transmission of charge determination result in step S340, ECU 310 cancels charge permission in step S355 and brings the processing forward to step S370, and issues a power feeding stop command.

In this manner, it is possible to construct a charging system capable of correctly identifying electric powered vehicle 100 which is a target of charging over the external charging term, by management of keeping vehicle key 150 held by key holding unit 350 of charge instructing device 300.

As described above, according to the charging system of an electric powered vehicle of the first embodiment, such a management that authentication is continuously made over the charging term by leaving vehicle key 150 in charge instructing device 300 rather than leaving in charger 200 installed close to a parking space of electric powered vehicle 100. Therefore, it becomes possible to execute a simple authentication operation using vehicle key 150 over the external charging term while ensuring the security.

As a result, it becomes possible to correctly identify electric powered vehicle 100 that is a target of external charging over the charging term in charging system shared by specified one or plural vehicle(s), for example, in a parking lot of a single-family house or an apartment house or a long-term parking lot, or in a charging system shared by an unspecified plurality of vehicles, for example, in a parking lot of store.

Modified Example 1 of the First Embodiment

In Modified example 1 of the first embodiment, an additional configuration suited for the charging system intended to be shared by an unspecified plurality of vehicles will be further described.

As will be described below, the charging system according to Modified example 1 of the first embodiment is realized by providing charge instructing device 300 with an additional configuration in the charging system according to the first embodiment as described above. Therefore, a different point between the charging system according to Modified example 1 of the first embodiment and the charging system according to the first embodiment will be described, and a common point thereof will not be described repeatedly.

Figure 5:
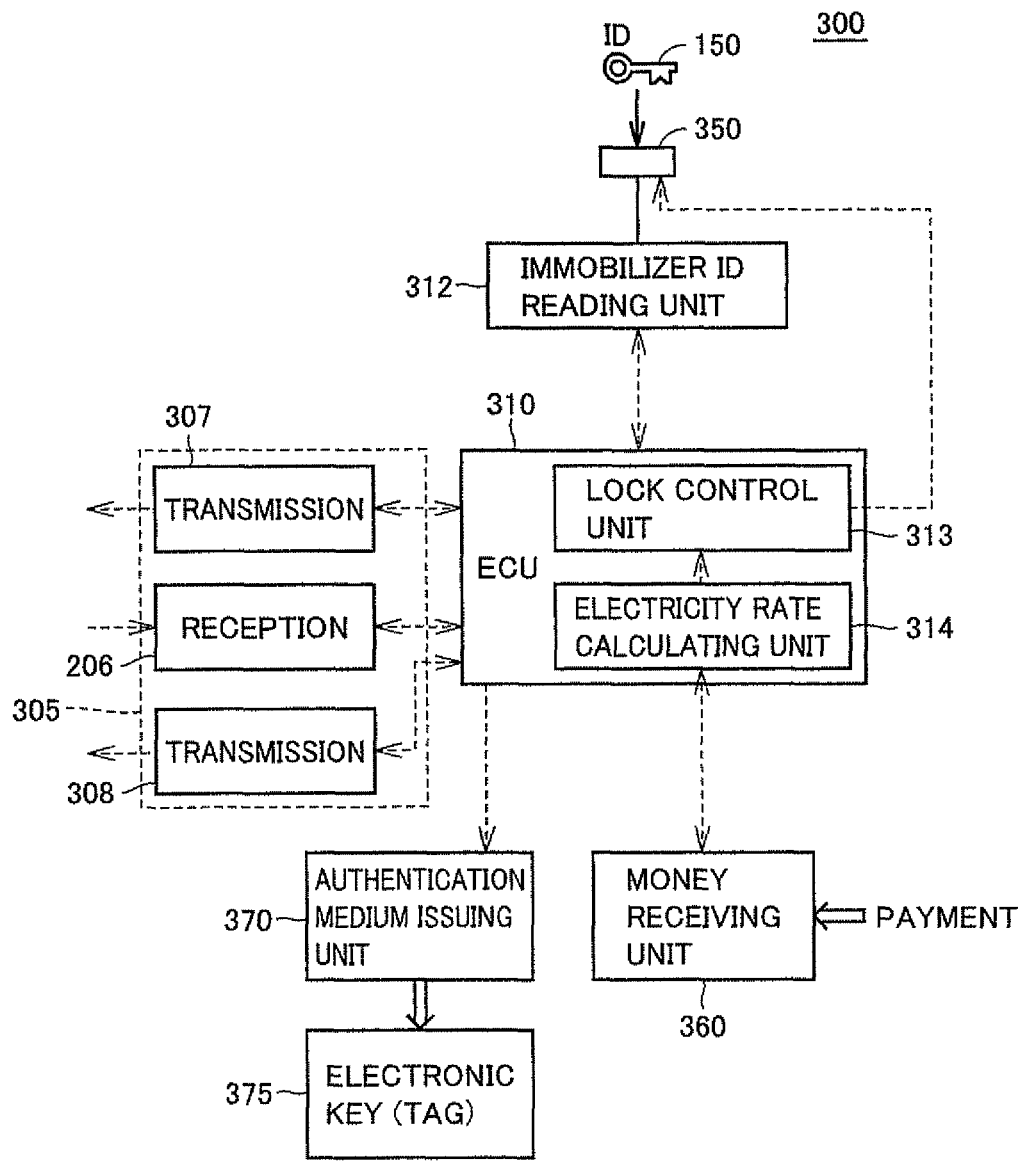
FIG. 5 is a block diagram for describing configuration of a charge instructing device in the charging system according to Modified example 1 of the first embodiment.
Figure 6:
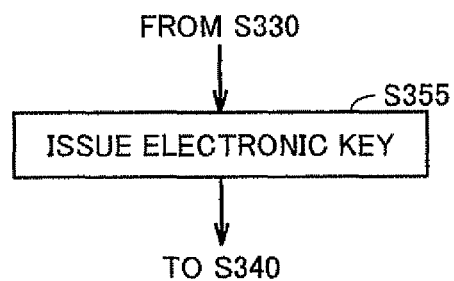
FIG. 6 is a flowchart for describing generation of an electronic key shown in FIG. 6.

With reference to FIG. 5, in the charging system according to Modified example 1 of the first embodiment, charge instructing device 300 further includes a money receiving unit 360 and an authentication medium issuing unit 370, in comparison with the configuration shown in FIG. 3. Key holding unit 350 is provided with a lock mechanism (not shown) for mechanically locking the holding of vehicle key 150, and ECU 310 has a lock control unit 313 for controlling execution/cancellation of locking by the lock mechanism, and an electricity rate calculating unit 314. Lock control unit 313 and electricity rate calculating unit 314 are functional blocks corresponding to the function realized by the processing in ECU 310.

Further, locking mechanism 330 that locks space 340 where charge instructing device 300 shown in FIG. 1 is installed executes locking according to electronic authentication. Authentication medium issuing unit 370 generates an electronic key 375 for canceling the electronic locking by locking mechanism 330 at the time of locking of vehicle key 150.

Figure 7:
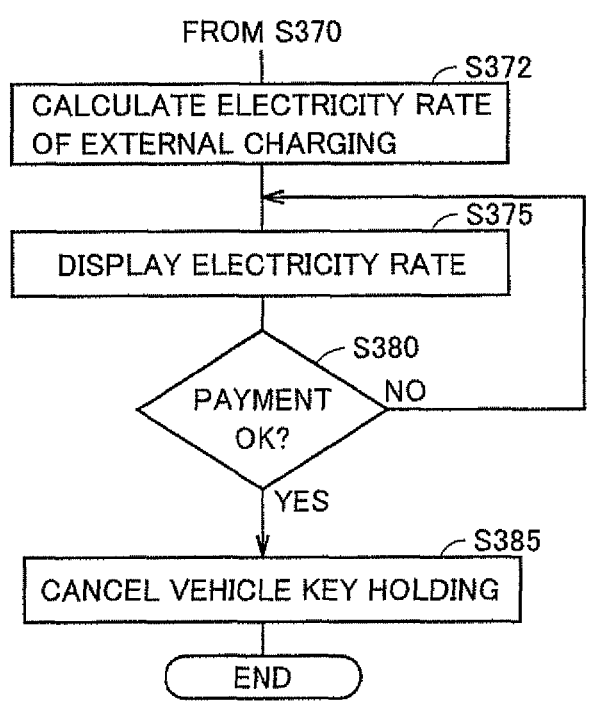
FIG. 7 is a flowchart for describing an accounting process of electricity rate.

In this case, as shown in FIG. 7, ECU 310 issues electronic key 375 in step S355 between step S330 and S340 in the flowchart of FIG. 3, namely when charging permission/prohibition determination is executed by charge instructing device 300 and external charging is started.

In this manner, since space 340 where charge instructing device 300 is installed can be electronically locked, the security can be improved under such a management that the condition that vehicle key 150 is held by key holding unit 350 is maintained over the external charging term.

Referring again to FIG. 5, electricity rate calculating unit 314 calculates electricity rate by the external charging based on information about electric energy of charging received from charger 200 at the end of the external charging. The calculated electricity rate is displayed in a display part that is not shown in the drawing.

Money receiving unit 360 accepts payment of displayed electricity rate at the end of external charging, and informs ECU 310 of completion of payment of electricity rate. When completion of payment of electricity rate by external charging is notified by money receiving unit 360, lock control unit 313 cancels the lock of vehicle key 150 held by key holding unit 350.

Such a processing is realized by combining the processing flow of charge instructing device 300 shown in FIG. 3 with the flowchart shown in FIG. 7.

With reference to FIG. 7, in charge instructing device 300, ECU 310 issues a power feeding stop command in response to notification of end of charging in electric powered vehicle 100 (step S370) and brings the processing forward to step S372, and calculates electricity rate by external charging based on information from charger 200. Then ECU 310 displays the electricity rate calculated in step S372 and informs the user of it in step S375. Further, ECU 310 determines whether or not payment of the displayed electricity rate is completed in step S380.

When payment of electricity rate is completed (YES determination in S380), ECU 310 cancels the locking of vehicle key 150 by key holding unit 350 in step S385. On the other hand, until the electricity rate is paid (NO determination in S380), ECU 310 does not execute step S385, so that locking of vehicle key 150 by key holding unit 350 is continued.

In this manner, it is possible to configure a charging system capable of returning vehicle key 150 in exchange for payment of electricity rate by external charging, on the basis of continuous authentication of a charge target vehicle by holding of vehicle key 150 over the external charging term. As a result, it is possible to configure a charging system suited for being shared by the unspecified plurality of vehicles, for example, in a parking lot of store.

Payment of electricity rate in step S380 (money receiving unit 360) is not limited to payment by cash, but payment may be achieved by payment by a prepaid card, or in exchange of benefit points given by shopping or use of facility and so on. Also, as described above, as to space 340 where charge instructing device 300 is installed, it may be realized by deployment of a watcher.

Modified Example 2 of the First Embodiment

In Modified example 2 of the first embodiment, description will be given for an additional configuration suited for a charging system under the premise that charger 200 is shared by members registered in advance, for example, in a parking lot of a single-family house or an apartment house, or shared by a plurality of specified vehicles.

As will be described below, the charging system according to Modified example 2 of the first embodiment is realized by providing charge instructing device 300 with an additional configuration in the charging system of the first embodiment as described above. Therefore, a different point between the charging system according to Modified example 2 of the first embodiment and the charging system according to the first embodiment will be described, and a common point thereof will not be described repeatedly.

Figure 8:
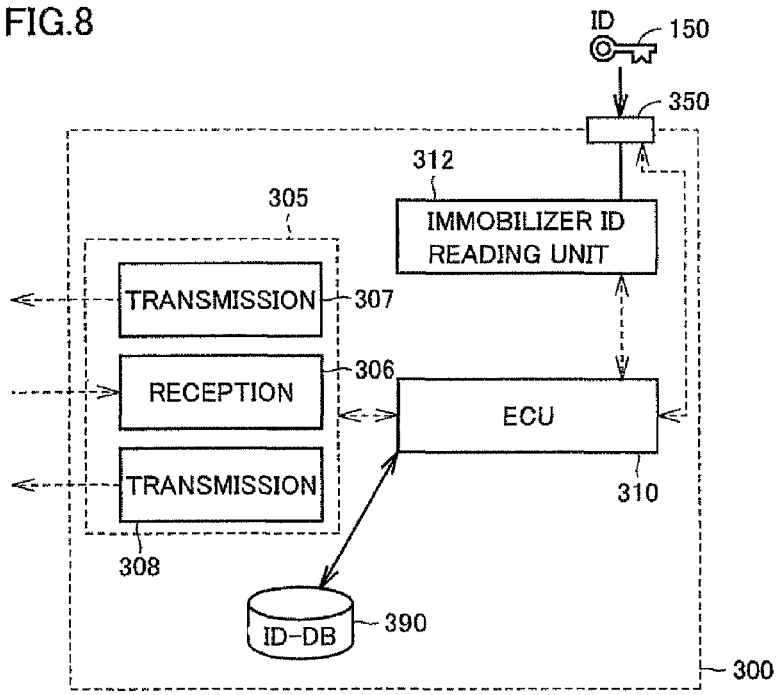
FIG. 8 is a block diagram for describing configuration of a charge instructing device in the charging system (first example) according to Modified example 2 of the first embodiment.

FIG. 8 is a block diagram for describing configuration of a charge instructing device in a charging system according to Modified example 2 of the first embodiment.

With reference to FIG. 8, in the charging system according to Modified example 2 of the first embodiment, charge instructing device 300 further includes an ID database 390, in comparison with the configuration shown in FIG. 2.

ID database 390 stores in advance a list of ID information of electric powered vehicle 100 that is permitted to charge with charger 200. That is, ID database 390 corresponds to "charge permitted target storing unit".

ECU 310 adds a determination whether or not authenticated electric powered vehicle 100 corresponds to an electric powered vehicle (charge permission vehicle) registered in advance in ID database 390 at the time of checking the authentication result in step S320 of FIG. 3.

As a result, in the charging system according to Modified example 2 of the first embodiment, whether or not authenticated electric powered vehicle 100 is a charge permitted target registered in advance is determined in addition to the authentication process for identifying electric powered vehicle 100 which is to be a target of charging similarly to the charging system of an electric powered vehicle of the first embodiment in step S320.

Then, when both of these conditions are established, step S320 is determined as YES, and the processings subsequent to step S330 for the case of charge permission are executed. In this manner, it is possible to construct a charging system that permits external charging in a limited way for a specified plurality of electric powered vehicles 100 registered in advance in a simple manner.

For improving the security of the charging system, it is preferred to make ID information (named ID2) registered in ID database 390 and key information (named ID1) read out from vehicle key 150 different from each other. Concretely, in the charging system according to Modified example 2 of the first embodiment, ID2 is given to electric powered vehicle 100 permitted as a target of charging by the manager of the charging system, and ID2 is stored in electric powered vehicle 100. In electric powered vehicle 100, with such a configuration that the aforementioned ID2 is transmitted together with authentication result (OK) in steps S145, S150 (FIG. 3), it is possible to manage the charging system according to Modified example 2 of the first embodiment without accumulating key information (ID1) of vehicle key 150 outside the vehicle.

Figure 9:
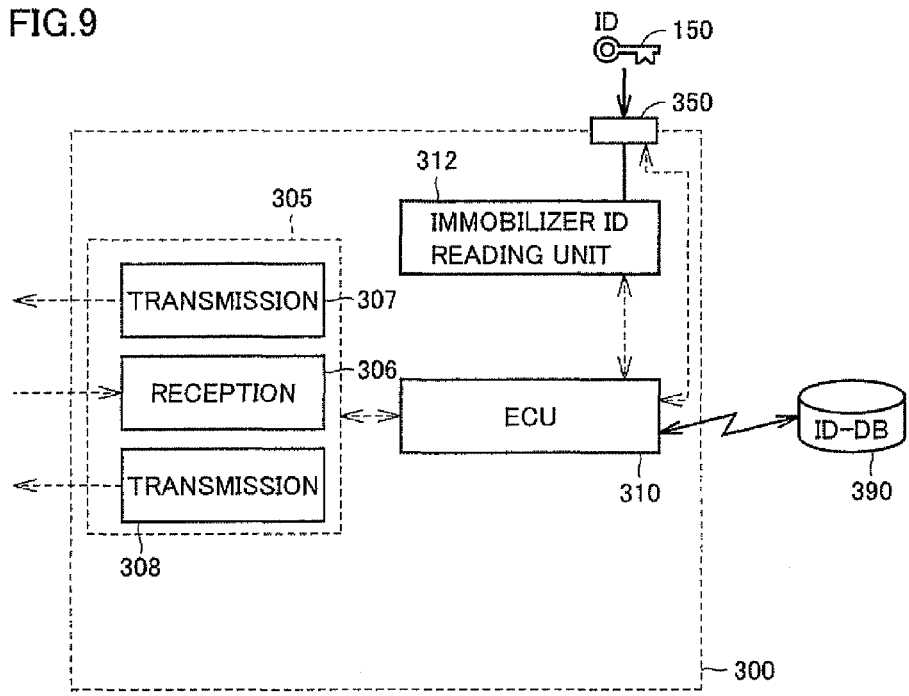
FIG. 9 is a block diagram for describing configuration of a charge instructing device in the charging system (second example) according to Modified example 2 of the first embodiment.

The charging system according to Modified example 2 of the first embodiment may be configured so that ID database 390 is installed outside charge instructing device 300 as shown in FIG. 9.

When the configuration as shown in FIG. 9 is employed, by connecting ECU 310 and ID database 390 by a communication means such as network, it is possible to authenticate whether or not authenticated electric powered vehicle 100 is a charge permitted target. With such a configuration, since authentication of common charge targets can be shared by a plurality of charge instructing devices 300, it is possible to easily construct extensive networks.

Second Embodiment

In a second embodiment, a configuration that authentication is executed only by charge instructing device 300 without execution of information transmission and reception via charger 200 between charge instructing device 300 and electric powered vehicle 100 will be described as a variation.

Figure 10:
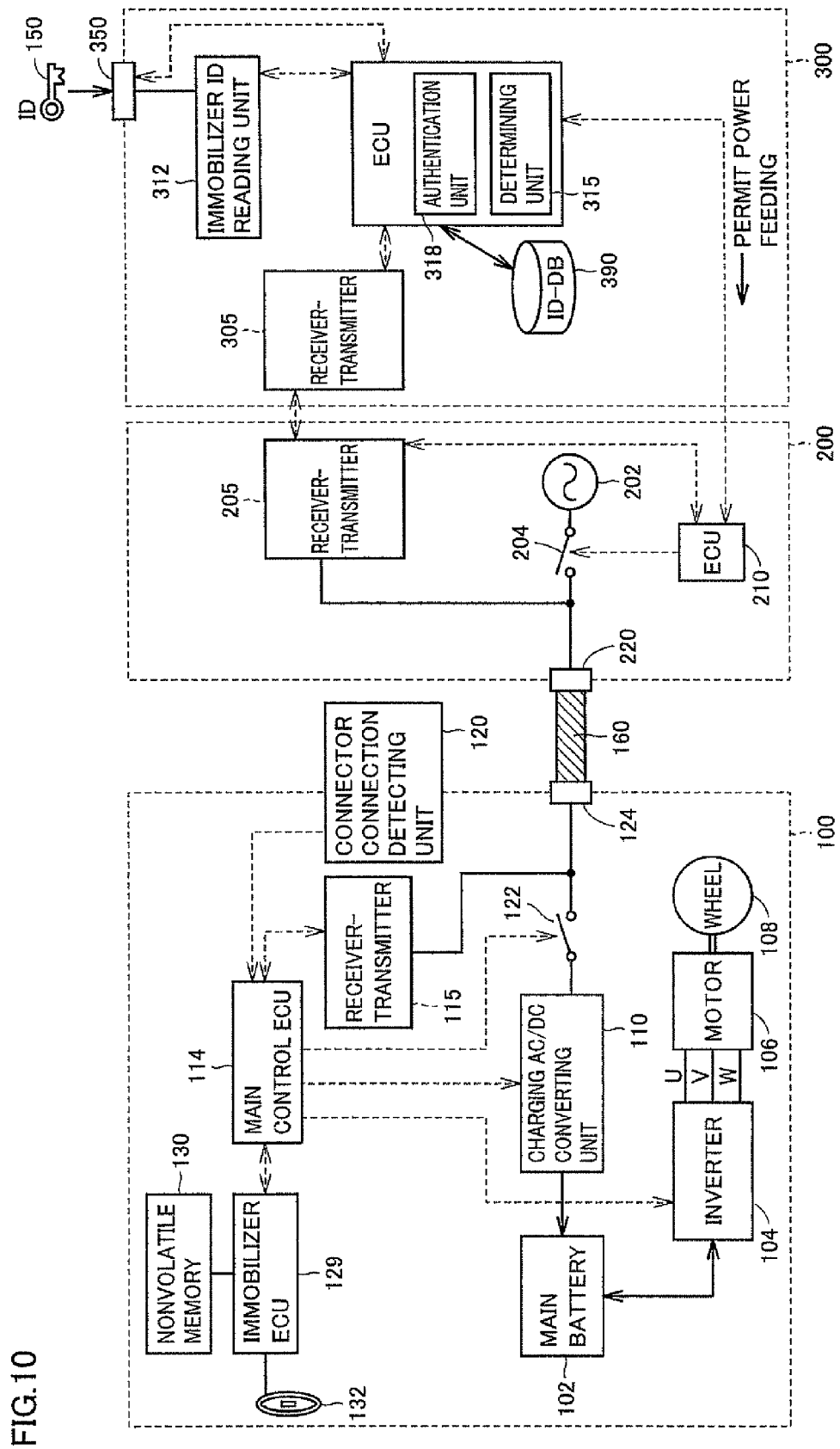
FIG. 10 is a block diagram for specifically describing configuration of a charging system according to a second embodiment of the present invention.

FIG. 10 is a block diagram for describing a configuration of a charging system according to the second embodiment of the present invention.

Referring to FIG. 10, the charging system according to the second embodiment is different from the charging system according to the first embodiment shown in FIG. 2 in that charge instructing device 300 is further provided with an authentication unit 318 and ID database 390. Other configuration is similar to that of the first embodiment, and detailed description will not be repeated. Authentication unit 318 is a functional block corresponding to the function realized by the processing by ECU 310. ID database 390 is as same as that shown in FIGS. 8 and 9. Also in the configuration of FIG. 10, communication cable 250 and receiving unit 218 may be provided in place of receiver-transmitter 205 as is the case with FIG. 12.

In the charging system according to the second embodiment, by ECU 310, key information (ID information) of vehicle key 150 read out by immobilizer ID reading unit 312 is authenticated by authentication unit 318. Then according to the authentication result in authentication unit 318, determining unit 315 determines whether charging is permitted or prohibited in a similar manner in the first embodiment.

In brief, in the charging system according to the second embodiment, authentication by information transmission and reception between charge instructing device 300 and electric powered vehicle 100 is not executed. However, mutual bi-directional communication between receiver-transmitters 115,205,305 is allowed.

Figure 11:
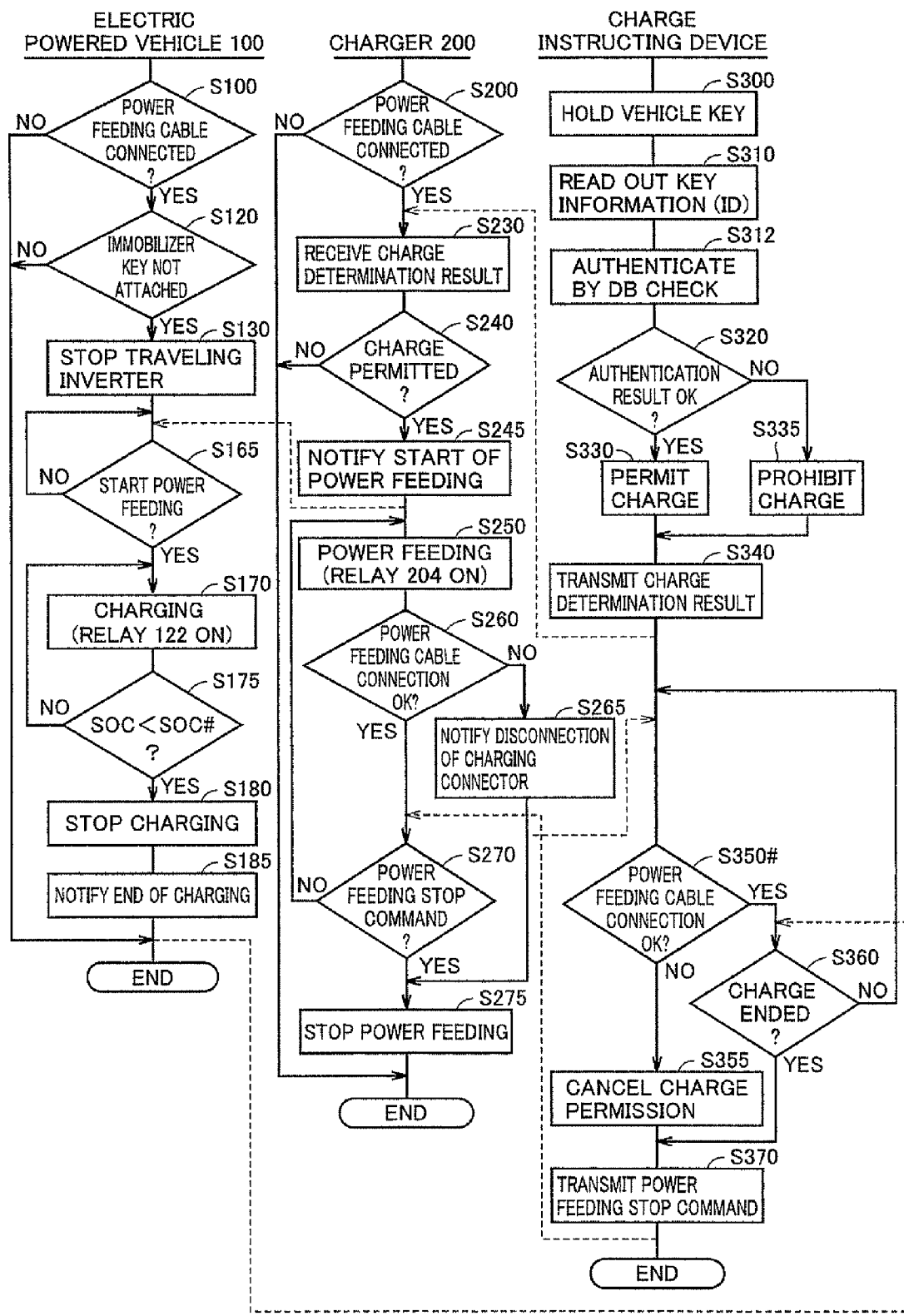
FIG. 11 is a flowchart for describing a processing procedure of authentication and external charging of an electric powered vehicle in a charging system according to the second embodiment.

FIG. 11 is a flowchart for describing a processing procedure of authentication and external charging of electric powered vehicle in the charging system according to the second embodiment.

Comparing the flowchart of FIG. 11 with the flowchart of FIG. 3, since authentication process by ID check is not no longer executed in electric powered vehicle 100, main control ECU 114 omits the processings in steps S140, S150, S160. After execution of step S130, main control ECU 114 starts power feeding in response to a power feeding start notification from charger 200 in step S165. When power feeding is started in step S165 (YES determination in S160), main control ECU 114 executes the processings subsequent to step S170 similarly to FIG. 3, and charges main battery 102 with electric power from external power source 202.

On the other hand, also in charger 200, it is no longer necessary to transmit and receive key information (ID) and an authentication result between charge instructing device 300 and electric powered vehicle 100, so that processings in steps S210, S215 and S220, S225 are omitted.

Then ECU 210 executes steps S230, S240 similarly to FIG. 3 in response to notification of charge determination result from charge instructing device 300. When external charging is permitted (YES determination in S240), ECU 210 notifies electric powered vehicle 100 of start of power feeding in step S245. This notification is reflected in the determination in step S165 as described above.

ECU 210 starts power feeding by turning on power feeding relay 204 similarly in FIG. 3 in step S250 after step S245. Then after start of power feeding, ECU 210 monitors whether or not power feeding cable 160 is connected to charging connector 124 and charging plug 220 in step S260. While power feeding cable 160 is connected (YES determination in S260), power feeding to electric powered vehicle 100 is executed until a power feeding stop command is issued from charge instructing device 300 in steps S270 and S275 similarly to FIG. 3.

On the other hand, when power feeding cable 160 is disconnected from electric powered vehicle 100 and/or charger 200 (NO determination in S260) after start of power feeding, charge instructing device 300 is notified of a disconnection of power feeding cable 160 in step S265. Although omitted in the drawing, determination in step S260 may be executed based on information from electric powered vehicle 100 while the disconnection of power feeding cable 160 from electric powered vehicle 100 and/or charger 200 is detected on the side of electric powered vehicle 100.

In charge instructing device 300, ECU 310 reads out key information (ID) from a vehicle key in steps S300, S310 similarly to FIG. 3, and executes authentication based on check of ID database 390 in step S312. That is, in step S312, it is possible to determine whether or not electric powered vehicle 100 specified by vehicle key 150 is a charge permitted target registered in advance.

ECU 310 executes steps S320 to S340 similarly to FIG. 3 based on the authentication result in step S312. After transmitting a charge determination result in step S340, ECU 310 determines whether or not a connection of power feeding cable 160 between electric powered vehicle 100 and charger 200 is maintained in step S350#.

When the connection of power feeding cable 160 is retained (YES determination in S350#), ECU 310 generates a power feeding stop command in response to end of charging in electric powered vehicle 100 through the processings in step S360, S370 similarly to FIGS. 3 and 4.

On the other hand, when the disconnection of power feeding cable 160 on the side of electric powered vehicle 100 and/or charger 200 is notified, ECU 310 makes determination of NO in step S350# and brings the processing forward to steps S355 and S370 similarly to FIG. 4. As a result, when power feeding cable 160 is disconnected after determination of charging is once executed, charge permission is cancelled (S355) and a power feeding stop command is issued (S370). In other words, the authentication result in step S312 is invalid after detachment of power feeding cable 160.

As described above, in the charging system according to the second embodiment, by charge instructing device 300 alone, authentication of whether or not the electric powered vehicle 100 is a charge permitted target by charger 200 is executed based on key information (ID) read out from vehicle key 150, and permission of external charging can be given to charger 200 based on the authentication result. That is, it is possible to configure a charging system suited for being shared by a specified plurality of vehicles installed in a parking lot of apartment house or the like, based on simple authentication. In particular, since ID database 390 can be installed in space 340 where security is ensured, security of the charging system can be improved.

However, in the charging system of the second embodiment, it is impossible to authenticate the charge target vehicle based on transmission and reception of information between electric powered vehicle 100 and charge instructing device 300 over the external charging term as is the case of the first embodiment. Therefore, by managing such a system that authentication is requested every time power feeding cable 160 is disconnected, electric powered vehicle 100 other than charge targets is prevented from being externally charged, and security can be improved.

The embodiments disclosed this time are examples in all points and should not be considered restrictive. The scope of the invention is not defined in the above description but is defined in claims and includes meanings equivalent to the claims and all modifications in the scope of claims.

The invention claimed is:

1. A charging system of an electric powered vehicle comprising:
    an electric powered vehicle mounted with an electric storage device;
    a charger for charging said electric storage device with an external power source outside said electric powered vehicle; and
    a charge instructing device for giving an instruction about whether to permit an external charging to said electric storage device by said external power source, based on key information stored in a vehicle key of said electric powered vehicle,
    said charge instructing device being provided separately from said charger, and arranged in a space where security is ensured comparatively to said charger,
    said electric powered vehicle including:
    a first receiving unit for receiving said key information;
    an authentication unit for generating authentication information by checking said key information received by said first receiving unit against registration information stored in advance; and
    a first transmitting unit for transmitting the generated authentication information,
    said charge instructing device including:
    a key holding unit for holding said vehicle key;
    a reading unit for reading out said key information from a vehicle key held by said key holding unit;
    a second transmitting unit for transmitting the read out key information to said electric powered vehicle;
    a second receiving unit for receiving said authentication information from said first transmitting unit;
    a determining unit for determining whether to permit said external charging based on said authentication information received by said second receiving unit; and
    a third transmitting unit for transmitting a determination result by said determining unit to said charger,
    said charger including:
    a third receiving unit for receiving said determination result from said third transmitting unit; and
    a power feeding unit for feeding power from said external power source to said electric powered vehicle connected to the charger via a power line when said external charging is permitted by said determining unit, based on said determination result received by said third receiving unit,
    wherein said checking and generation, transmission and reception of said authentication information based on said checking are executed also after starting of said external charging,
    said determining unit cancels the permission of said external charging when said authentication information turns into abnormal during execution of said external charging, and
    said power feeding unit stops power feeding to said electric powered vehicle from said external power supply when said determining unit cancels said permission of said external charging.

2. The charging system of an electric powered vehicle according to claim 1, wherein said charge instructing device is installed in a space where a locking mechanism for permitting entrance and exit based on electronic authentication is provided.

3. The charging system of an electric powered vehicle according to claim 2, wherein said charge instructing device further includes an authentication medium issuing unit for issuing a medium used for the electronic authentication in unlocking said locking mechanism in response to holding of said vehicle key by said key holding unit.

4. The charging system of an electric powered vehicle according to claim 1, wherein said key holding unit is configured to hold said vehicle key and lock the holding state, and said charge instructing device further includes:
    a rate calculating unit for calculating electricity rate by said external charging; and
    a lock control unit for unlocking said vehicle key in said key holding unit in response to payment of said electricity rate.

5. The charging system of an electric powered vehicle according to claim 1, wherein said charge instructing device further includes
    a charge permitted target storing unit for registering in advance authentication information corresponding to the electric powered vehicle for which said external charging by said charger is permitted, and
    said determining unit prohibits said external charging, when said authentication information received by said second receiving unit does not coincide with said authentication information registered in said charge permitted target storing unit.

6. The charging system of an electric powered vehicle according to claim 1, wherein said charger includes a mechanism for relaying said key information transmitted from said charge instructing device to said electric powered vehicle and said authentication information transmitted from said electric powered vehicle to said charge instructing device between said electric powered vehicle connected to the charger via said power line and said charge instructing device.

7. The charging system of an electric powered vehicle according to claim 1, wherein said vehicle key is common to a vehicle start key for starting said electric powered vehicle.

8. A charging system of an electric powered vehicle comprising:
    a charger for charging an electric storage device mounted to the electric powered vehicle with an external power source outside said electric powered vehicle; and
    a charge instructing device for giving an instruction about whether to permit an external charging to said electric storage device by said external power source based on key information stored in a vehicle key of said electric powered vehicle,
    said charge instructing device including:
    a reading unit for reading out said key information from said vehicle key;
    an authentication unit for generating authentication information by checking said key information read out by said reading unit against registration information stored in advance for indicating the electric powered vehicle for which said external charging is permitted by said charger; and
    a determining unit for determining whether to permit said external charging based on said authentication information generated by said authentication unit, said charger including:
a power feeding unit for feeding power from said external power source to said electric powered vehicle connected to the charger via a power line when said external charging is permitted by said determining unit, said charging system further comprising:
a detecting unit for detecting a disconnection of said power line during power feeding to said electric powered vehicle by said power feeding unit,
wherein said determining unit cancels permission of said external charging when the disconnection of said power line is detected by said detecting unit.

9. The charging system of an electric powered vehicle according to claim 8, wherein said charge instructing device is provided separately from said charger, and arranged in a space where security is ensured comparatively to said charger.

10. A charging system of an electric powered vehicle comprising:
a charger for charging an electric storage device mounted to the electric powered vehicle with an external power source outside said electric powered vehicle; and
a charge instructing device for giving an instruction about whether to permit an external charging to said electric storage device by said external power source based on key information stored in a vehicle key of said electric powered vehicle,
said charge instructing device being provided separately from said charger, and arranged in a space where security is ensured comparatively to said charger,
said charge instructing device including;
a key holding unit for holding said vehicle key;
a reading unit for reading out said key information from a vehicle key held by said key holding unit;
a key information transmitting unit for transmitting the read out key information to said electric powered vehicle;
an authentication information receiving unit for receiving authentication information that is generated by checking said key information in said electric powered vehicle against predetermined registration information, and transmitted from said electric powered vehicle;
a determining unit for determining whether to permit said external charging based on the received authentication information; and
a determination result transmitting unit for transmitting a determination result by said determining unit to said charger,
said charger including:
a determination result receiving unit for receiving said determination result from said charge instructing device, and
a power feeding unit for feeding power from said external power source to said electric powered vehicle connected to said charger via a power line when said external charging is permitted by said determining unit based on the received determination result,
wherein said checking and generation, transmission and reception of said authentication information based on said checking are executed also after starting of said external charging,
said determining unit cancels said permission of external charging when said authentication information turns into abnormal during execution of said external charging, and
said power feeding unit stops power feeding to said electric powered vehicle from said external power supply when said determining unit cancels said permission of external charging.

11. The charging system of an electric powered vehicle according to claim 10, wherein said charge instructing device is installed in a space where a locking mechanism for permitting entrance and exit based on electronic authentication is provided.

12. The charging system of an electric powered vehicle according to claim 11, wherein said charge instructing device further includes an authentication medium issuing unit for issuing a medium used for the electronic authentication in unlocking said locking mechanism in response to holding of said vehicle key by said key holding unit.

13. The charging system of an electric powered vehicle according to claim 11, wherein said key holding unit is configured to hold said vehicle key and lock the holding state, and said charge instructing device further includes:
a rate calculating unit for calculating electricity rate by said external charging; and
a lock control unit for unlocking said vehicle key in said key holding unit in response to payment of said electricity rate.

14. The charging system of an electric powered vehicle according to claim 10, wherein said charge instructing device further includes
a charge permitted target storing unit for registering in advance authentication information corresponding to the electric powered vehicle for which said external charging by said charger is permitted, and
said determining unit prohibits said external charging, when said authentication information received by said authentication information receiving unit does not coincide with said authentication information registered in said charge permitted target storing unit.

15. The charging system of an electric powered vehicle according to claim 10, wherein said charger includes a mechanism for relaying said key information transmitted from said charge instructing device to said electric powered vehicle and said authentication information transmitted from said electric powered vehicle to said charge instructing device between said electric powered vehicle connected to the charger via said power line and said charge instructing device.

* * * * *